July 24, 1956   F. C. WILLIAMS ET AL   2,755,994
ELECTRONIC DIGITAL COMPUTING DEVICES
Filed Jan. 30, 1950                                 5 Sheets-Sheet 2

F. C. Williams
T. Kilburn
Inventors

By Moore & Hall
Attorneys

July 24, 1956        F. C. WILLIAMS ET AL        2,755,994
ELECTRONIC DIGITAL COMPUTING DEVICES
Filed Jan. 30, 1950                              5 Sheets-Sheet 5

F. C. Williams
T. Kilburn
Inventors

By Moore & Hall
Attorneys

United States Patent Office 2,755,994
Patented July 24, 1956

2,755,994

ELECTRONIC DIGITAL COMPUTING DEVICE

Frederic C. Williams, Timperley, and Tom Kilburn, Manchester, England, assignors to National Research Development Corporation, London, England, a corporation of Great Britain Application January 30, 1950, Serial No. 141,176

Claims priority, application Great Britain January 31, 1949

17 Claims. (Cl. 235—61)

The present invention relates to electronic digital computing machines of the kind which operate by handling a mathematitcal problem as a series of simple arithmetical operations performed within the machine upon data stored in the machine in a sequence determined by a "table of instructions" also stored in the machine.

Such machines have a main storage system or memory in which are stored the numbers representing the data to be operated upon and also numbers which represent in coded form the instructions which the machine has to obey in sequence. These numbers will be hereinafter referred to as "words" and words which represent the data to be operated upon will be called "number-words" whilst words which represent the instructions will be called "instruction-words." Each word will thus consist of a series of digits the coefficients of which have to be represented at spatially separated points in the storage system by the condition or state of some variable quantity. Since it is great simplification to have to represent only two distinct states it is customary in such machines to employ the binary system of notation in which the coefficient of each digit to be represented is either 0 or 1. Clearly the representation of each word in a storage system will have a definite location therein which will be called the "address" of the word.

The movement of a word from one address to another will involve processes which will be called "reading" and "writing." In reading the static representation of a word in a storage system digit-by-digit, there is generated a varying voltage, the level of which at a particular instant is representative of the digit coefficient being read at that instant. This varying voltage will thus represent in dynamic form the digit coefficients of the word being read. In the binary system one of the two voltage levels is usually chosen to be the resting or reference level of the voltage, so that the dynamic representation of a word will consist of a train of voltage pulses, such a voltage pulse being present whenever the digit coefficient is of one kind (usually 1) and no pulse being present which it is of the other kind (usually 0). In the writing process this varying voltage is used to reconstitute the static representation of the word in a storage system. A machine employing such reading and writing processes is said to operate in the series mode. In an alternative mode of operation, known as the parallel mode, the stored digits are read simultaneously, the resulting voltages, each representing a digit coefficient, occurring simultaneously in a number of separate channels equal to the number of digits.

Machines of this kind also include a device known as an accumulator which comprises one or more computing circuits. Each of these when fed with two varying voltages each of which is the dynamic representation of a word, is capable of producing output voltages which represent dynamically an answer word, the answer being the result of the addition or other arithmetical operation performed by the computing circuit on the data fed to it. The accumulator also includes a storage system into which answer words can be written and retained until they are required. Thus it becomes necessary to transfer number words from selected addresses in the main storage system to a selected address in the accumulator and vice versa, the information which defines each such movement being contained in a specific instruction word. Certain digits of an instruction word must therefore define the address of a number word which is to be operated on, whilst other digits must define the address to which it is to be moved. Other digits of an instruction word will define functions to be performed by parts of the machine, for example, those parts which control the direction of movement between the main storage system and the accumulator. To utilize the information contained in an instruction word it is necessary firstly to set up circuits to select it and thus enable it to be read, and secondly to read it and to utilize the resulting voltages to set up appropriate routing circuits within the machine to enable the instruction to be carried out.

The present invention is concerned with computing machines in which the storage devices are cathode ray tubes, the information being stored in each tube in the form of an electric charge pattern on an insulating surface within the tube. A digit coefficient of a word is represented by the state of charge of a discrete area of the surface, the charges on these areas being produced by the cathode ray beam which is caused to explore the surface. The electron velocity of the beam is such that the number of secondary electrons liberated from the surface is greater than the number of primary electrons arriving, so that an area rapidly assumes the usual positive equilibrium potential. This equilibrium potential is used as one of the states of charge which can be given to an area and thus represents one of the possible values of a digit coefficient. A different state of charge representing another value of a digit coefficient is produced by first bombarding an area to equilibrium potential and then acting on the beam to cause it to liberate further secondary electrons from the surface, which are attracted to the positively charged parts of the area to reduce the charge thereon to a different value. It is thus possible to write the digits of a word into the store by causing the instantaneous value of the varying voltage which represents the coefficient of a particular digit to act upon the beam to produce an appropriate state of charge on a specific area of the insulating surface. A pick-up plate and output circuit is associated with each tube so that as the beam explores a particular charged area there will appear at an appropriate point in the output circuit an instantaneous voltage representing the state of charge on the area, so that it is possible to read the information contained in the store. This reading voltage can also be fed back through a regenerative loop to act on the beam to cause it to maintain upon the area being explored, the state of charge already on that area. Thus although the decay time of the charge may be of the order of 0.2 second, it is possible by such repeated regeneration to maintain the charge more or less indefinitely.

Cathode ray tube storage systems of this kind are described in the specifications of co-pending applications Serial Nos. 790,879, 50,136 and 124,192.

Exploration of the digit areas will normally proceed word-by-word in a regular and repetitive fashion for the purpose of continuously regenerating the charge pattern, reading voltages being obtained all the time. However, in order to obtain immediate access to the digit areas of a particular word for the purpose of reading it, or of writing a new word in its place, a modification of this regular word-by-word exploration is employed. The exploration of the digit areas of a complete word will occupy a period of time which will be called a "beat." During every other beat the regular word-by-word exploration of the surface to effect regeneration of the charge will take place; during each intervening beat the exploration is switched to the digit areas of a word selected for action. The beats during which a selected word is explored will be called "action beats," whilst the intervening beats during which words are being explored in regular sequence to effect regeneration, will be called "scan beats." A description of this mode of operation and of control circuits arranged to produce this type of exploration of a charge pattern are to be found in the specification of co-pending application Serial No. 93,612.

According to the present invention, in a computing machine employing a main cathode-ray tube storage device with a regenerative feed-back loop, in which regeneration occurs during scan beats and a selected word is made available during intervening action beats, the time occupied by a scan beat is utilized in conditioning routing circuits within the machine in accordance with information contained in a selected instruction word read during the immediately preceding action beat.

Preferably, the selected instruction word is written into a subsidiary cathode-ray tube storage device during the action beat and is read out of this store during the next scan beat to condition the routing circuits. By this means, considerable economy in the number and nature of the routing circuits is achieved.

According to a feature of the invention, in a computing machine arranged to obey a series of consecutive instructions, the instruction words being retained in consecutively numbered addresses in the main cathode-ray tube storage device, the address number of the instruction being obeyed (the "present instruction") is retained in a control register comprising a cathode-ray tube storage device and an associated adding circuit, and each instruction is obeyed during a period of several consecutive beats, hereinafter referred to as a "bar" (to use a musical analogy) in the following steps: during the first scan beat the address number of the present instruction word is read from the control register and utilized to condition routing circuits to enable the present instruction word to be read; during the first action beat the present instruction word is read and written into the subsidiary store; during the second scan beat the present instruction word is read from the subsidiary store and utilized to condition routing circuits in accordance with information contained therein; during the second action beat and as many successive beats as may be necessary the present instruction is obeyed by the machine; and during the first scan beat of the next bar the address number in the control register is altered and the new address number is read therefrom to select the next instruction.

Other features of the invention will become apparent from a consideration of the following particular description of the main storage system, routing circuits, control register and subsidiary instruction store of a binary digital computing machine operating in the series mode. In this description no attempt has been made to describe in detail a complete machine; only those parts of it necessary to an understanding of the present invention are described.

In the drawings accompanying this description.

As the operation of the machine is based upon the operation of the cathode-ray storage units employed in the main and subsidiary stores and control register a detailed description of the reading and writing circuits of such a unit will first of all be given with reference to Figs. 1–4. The beam of the cathode-ray tube 1 is arranged to produce on the tube screen a television type raster, by applying a suitable sweep voltage through terminals 2 and 3 to the X and Y plates of the tube. Each cycle of the voltage applied to the X-plates occupies the time of one beat, and during this cycle it causes the beam to scan one line on the screen and to execute the necessary fly-back. The voltage applied to the Y-plates causes consecutive lines to be scanned during scan beats, and selected lines to be scanned during intervening action beats. Thus each line on the tube screen will represent, by the potential distribution along it, the digits of one word. If the tube is required to store only one line the sweep voltage for producing deflections in the Y-direction is dispensed with. It will be assumed that the kind of charge pattern used to represent the digit coefficients is the "dot-dash" system described in the specification of co-pending patent application Serial No. 50,136. In this system, the digit 0 is recorded by applying to the grid 4 of the tube 1 a pulse of 2 microseconds' duration which turns the beam on for that period, causing it to write a dot on the screen. To write a dash, which represents the digit 1, this pulse is lengthened to 5 microseconds, thus turning the beam on for this longer period.

Figure 1:
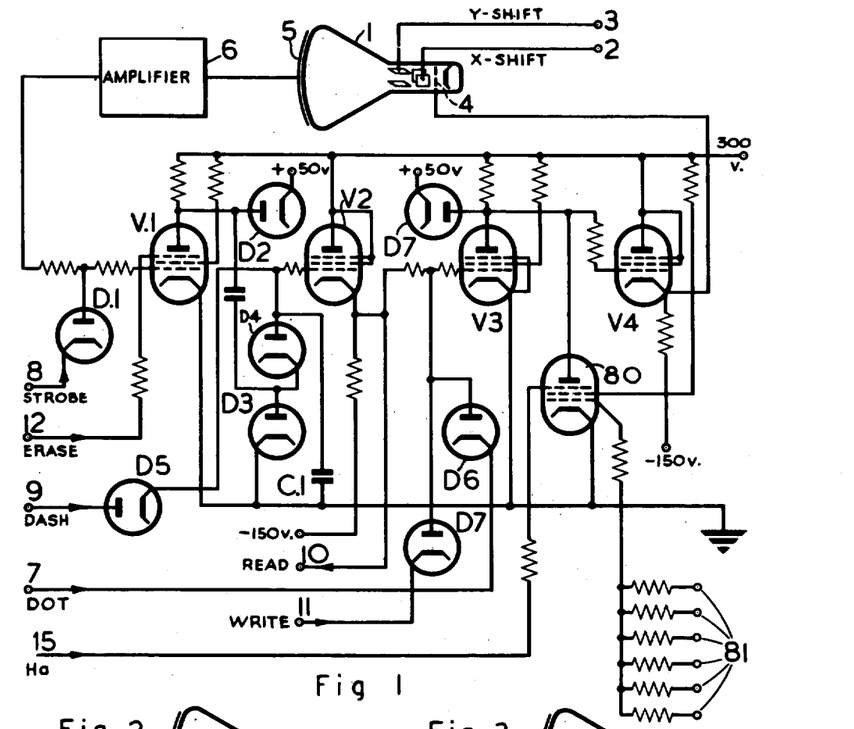
Figs. 1–3 illustrate the cathode-ray tube storage unit and associated circuits used in the machine.

These two kinds of pulses, which are generated continuously in a manner to be described are called dot and dash pulses respectively. It can be shown that when this kind of charge pattern is scanned the output signal from the pick-up plate 5 will contain a positive transient when a dash is being traversed by the beam, but when a dot is detected in this way, a negative transient is produced.

Figure 4:
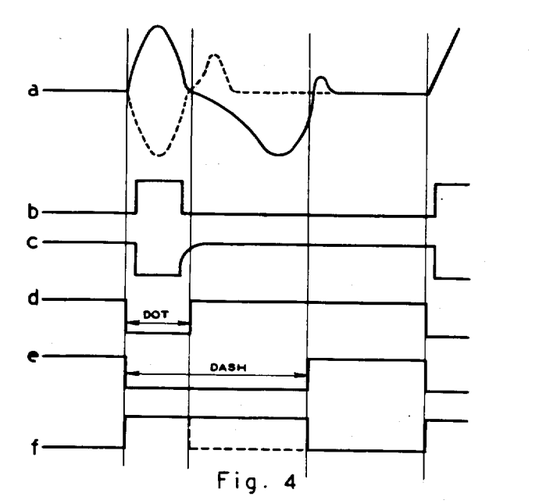
Fig. 4 is a diagram showing the waveforms present in the circuit of Fig. 1.

The circuit of Fig. 1 will now be described in detail, the relevant waveforms being shown in Fig. 4. Negative-going dot pulses, Fig. 4($d$), about a resting level of $+5$ volts, are fed through a Dot terminal and the diode $D_6$ and cut-off valve $V_3$, the anode of which thus rises until caught by the diode $D_7$ at about $+50$ volts. The resultant anode waveform, shown dotted at Fig. 4($f$), is cathode followed by $V_4$ and fed to the grid 4 to produce a standard display of dots. The output signals are fed through an amplifier 6 to the grid of the valve $V_1$. In response to the detection of a dash on the tube screen valves $V_1$ and $V_2$ operate to extend the dot pulse on the grid of $V_3$ into a dash pulse. The amplifier output produced in response to the detection of a dash recorded on the screen is indicated in full line on Fig. 4($a$) while the dotted line indicates the output corresponding to a dot. This amplifier output, biassed to $-15$ volts, is fed to the grid of $V_1$ together with a strobe pulse wave, Fig. 4($b$) which is fed through the strobe terminal 8 and a diode $D_1$ about a resting level of $-10$ volts. $V_1$ is normally cut-off and can only conduct when a positive amplifier output pulse coincides with a positive strobe pulse, the wave, Fig. 4($c$), comprising a negative pulse, from the resting level of $+50$ volts defined by the diode $D_2$, being then produced at the anode of $V_1$. This anode voltage wave, which has a negative pulse for every positive transient produced in the amplifier output by the detection of a dash on the tube screen, is cathode followed by $V_2$, the upper grid voltage limit of which is defined at zero by conduction of $D_3$ and $D_4$ and the lower grid voltage limit of which is defined at $-15$ volts by conduction of diode $D_5$ to which is fed through the Dash terminal 9 and diode $D_5$ the negative-going dash pulses, Fig. 4($e$), about a resting level of $-15$ volts. The cathode of $V_2$ will thus swing in voltage between the approximate limits of $+3$ and $-12$ volts, which are sufficient to cause full anode current or zero anode current. The condenser $C_1$ prevents the grid voltage changing unless driven so that after a negative pulse is applied from the anode of $V_1$ the grid of $V_2$ will remain at $-15$ volts for the duration of the dash pulse applied to the anode of $D_5$. At the end of the dash pulse the grid voltage will be driven to zero and remain at that level until another negative pulse is obtained from the anode of $V_1$.

The action of this portion of the circuit may be summarised as follows: If the display at a certain spot on the tube screen was previously a dot, a negative pulse will be delivered by the amplifier during the strobe pulse period when the spot is bombarded again. Since the control grid of $V_1$ is normally cut-off the negative pulse has no effect, the circuit of valves $D_1$, $V_1$, $V_2$ is inoperative and a dot will be re-written into the spot considered, by the action of the dot waveform applied to $D_6$. The dotted waveforms in Fig. 4 represent this condition. If however the display was previously a dash, a positive pulse will be obtained from the amplifier, which turns on $V_1$. The resulting negative pulse at the anode of $V_1$ drives the grid of $V_2$ to $-15$ volts where it remains until driven back to zero volts by the dash pulse. The grid of $V_3$ is therefore cut off initially by the dot pulse and held off for a dash period by the cathode of $V_2$, with the result that the dash display is reproduced at the particular point concerned on the tube screen. It can thus be seen that the circuit of valves $V_1$—$V_4$ provides a normal dot display which may be converted to a dash display by the overriding control effected by a dash waveform fed to the grid circuit of $V_3$. It is clear that there will appear at the Read terminal 10 a voltage wave consisting of dash pulses, such a pulse being present whenever a dash (representing the digit 1) was detected on the tube screen, and no pulse being present whenever a dot (representing the digit 0) was detected. Such a voltage wave thus represents in dynamic form the word which is being read. If it is desired to erase any word stored on the screen and write in its place a new word, which is represented dynamically by dash pulses and is fed to the grid of $V_3$, through the Write terminal 11 and diode $D_7$ then it is necessary to break the regenerative loop by applying a negative pulse of the desired timing and duration, through the Erase terminal 12 to the suppressor grid of $V_1$.

Figure 2:
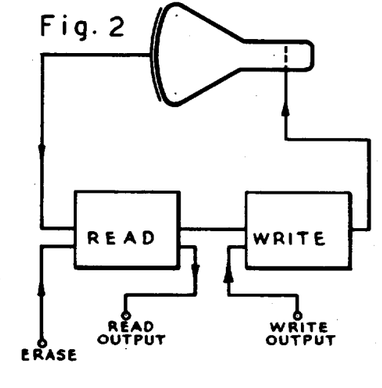

The circuit of Fig. 1 can be drawn diagrammatically in the form shown in Fig. 2, in which the rectangle marked Read comprises the valves $V_1$ and $V_2$ and the associated diodes, whilst the rectangle marked Write includes the valves $V_3$ and $V_4$ and the associated diodes of Fig. 1. The diagrammatic representation is used in Fig. 3 to show an important modification in which the output of the reading circuit (the cathode of $V_2$) instead of being connected to the input of the writing circuit (the control grid of $V_3$) is connected to one input terminal of an adding circuit, the Write terminal being connected to the other input terminal. If a train of dash pulses representing a number A is fed to this Write terminal, and a train of dash pulses representing a number B (stored in the tube) is fed from the reading circuit (no voltage being applied to the Erase terminal), the adding circuit will deliver a train of dash pulses representing the number $A+B$, which is then written by the writing circuit in place of the number B. If a negative voltage is applied to the Erase terminal, then the number A will be written in place of the number B, since $A+0=A$. Similarly if A is zero, the number B will be regenerated. It should be noted that there are two read outputs simultaneously available with this circuit, one from the reading circuit representing the number B and the other from the adding circuit representing the number $A+B$. The inclusion of an adding circuit in the circuit of Fig. 1 is described in detail in the specification of co-pending application Serial No. 119,306, now Patent No. 2,671,607.

Figure 11:
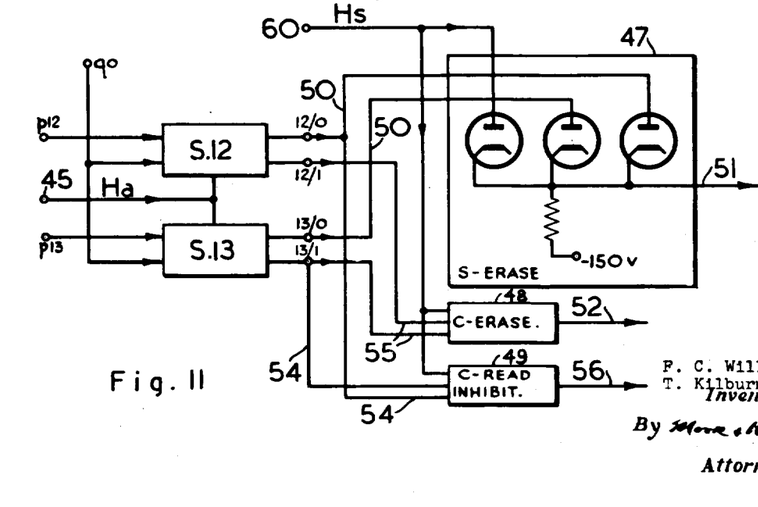

The use of the black-out valve 80 shown in Fig. 1 will be described in detail with reference to Fig. 11; at present it need only be noted that this valve, when rendered conducting during action beats by the application to its suppressor grid of the appropriate waveform from terminal 45, blacks out the cathode-ray beam, but that this action can be overridden by the application of appropriate negative-going voltages to its control grid from the terminals 81.

Figure 5:
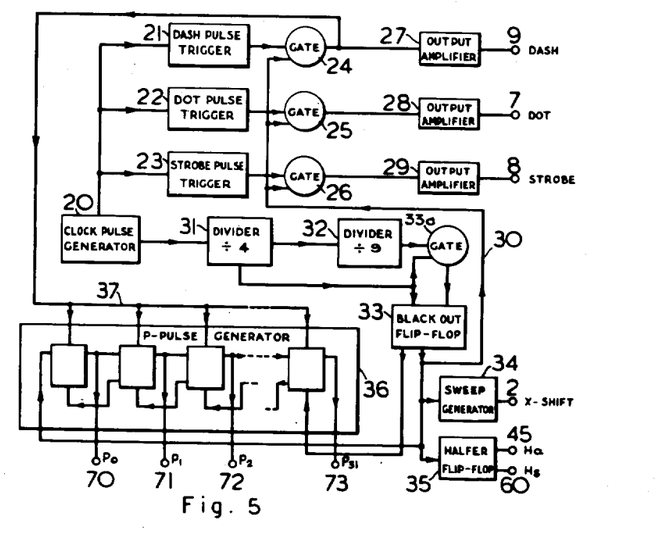
Fig. 5 is a block schematic diagram illustrating the generation of the various waveforms used in the machine.

A description of the various timing waveforms used in the machine will now be given with reference to Figs. 5–7 of the accompanying drawings. The basic timing wave from which all others are derived consists of a train of clock-pulses recurring at intervals of 8.5 microseconds, this wave being illustrated in Fig. 6(a). It is generated by the circuit 20 (Fig. 5) which comprises a conventional sine-wave oscillator followed by a shaping circuit and cathode-follower output stage. From this basic waveform are derived the dot, dash and strobe pulses already referred to. These have the same frequency of recurrence as the clock-pulses but occur in groups of 32 consecutive pulses separated by gaps, each gap occupying a time equal to that occupied by four clock-pulses. The dash pulses, shown in Fig. 6(b), comprise negative-going pulses, each lasting for 5 microseconds and having its leading edge coincident with the leading edge of a clock-pulse. As already mentioned these pulses are, by their presence or absence, used in the machine to represent in dynamic form the number and instruction words. It is convenient to consider each pulse in a group of 32 consecutive pulses as possessing its own number corresponding to its position in the group; in Fig. 6(b) the pulses have been numbered 0–31. Thus dash-pulse 0 (representing the digit-position $2^0$ of a given word) will, if present, indicate that the coefficient of this digit is 1 and, if absent, that the coefficient is 0.

Figure 6:
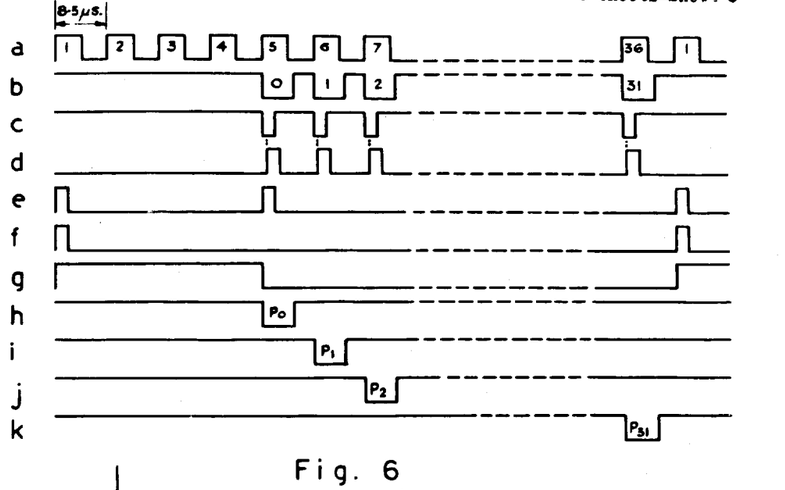
Figs. 6 and 7 are diagrams showing the waveforms produced by the arrangement of Fig. 5.
Figure 7:
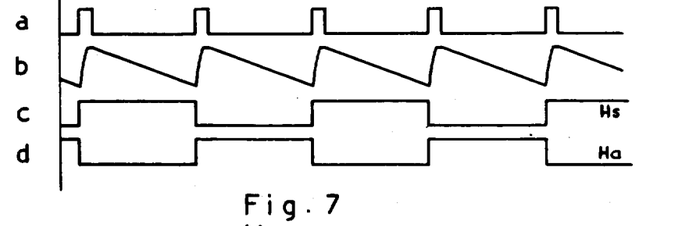

The dot pulses, shown in Fig. 6(c) have a duration of 2 microsceonds and again the leading edge of each coincides with that of a clock-pulse. The strobe pulses shown in Fig. 6(d) consists of positive-going pulses of 2 microseconds duration having their leading edges slightly delayed with respect to the leading edges of the clock-pulses.

Each pulse train is produced by means of apparatus comprising a trigger circuit 21—23 (Fig. 5) a coincidence gate circuit 24—26 and an output amplifier and pulse shaping circuit 27—29. Coincidence gate circuits 24—26 are of the type to be described later with reference to Fig. 10. The circuits 21 and 22 are triggered by the leading edges of the clock-pulses and have resetting times of 5 and 2 microseconds; the circuit 23 is similarly triggered but includes a delay on the input side. The coincidence gate circuits are fed in parallel over lead 30 with a black-out waveform shown in Fig. 6(g) which is positive-going for the period of 4 clock-pulses and negative-going for a period of 32 clock-pulses. During the positive portion of this waveform the gate circuits are closed and the negative-going outputs from the trigger circuits suppressed. The negative-going outputs from the gates 24—26 are shaped and amplified and fed to the output treminals 7, 8 and 9, the output circuit 29 inverting the pulses fed thereto so that they have the required positive-going polarity.

The basic clock-pulse waveform is also applied to two frequency dividers 31, 32 (which can be of the kind described in British Patent No. 584,329) connected in series, the first delivering one output pulse for every four clock-pulses applied thereto and the second delivering an output pulse for every nine pulses applied to it from divider 32. The output waveforms from these two dividers are illustrated in Figs. 6(e) and 6(f). From these two waveforms there is derived the black-out waveform illustrated in Fig. 6(g) and referred to above. This is achieved by means of a direct-coupled flip-flop circuit 33 having two stable states and consisting of the usual pair of valves with their grids and anodes cross-connected through resistances. The flip-flop is triggered into one stable state by the simultaneous application of the outputs of dividers 31 and 32 to a coincidence gate 33a to produce a positive pulse on the grid of one valve. Clearly this can happen only once every 36 clock-pulses when pulses in the outputs of 31 and 32 coincide. The flip-flop is triggered into the other stable state by the next pulse in the output of divider 31 which is applied to the grid of the second valve. The succeeding pulses in the output of divider 31 can have no triggering effect on the flip-flop since this will remain in its stable condition until the next pair of coincident pulses arrive at the gate 33a. The black-out waveform is taken from the anode circuit of the second valve of the pair, whilst a paraphrased version of it can be taken from the anode circuit of the first valve.

The black-out waveform is also used to control the sweep voltage generator 34 which produces the X-time base voltage for all the storage tubes used in the machine. The waveform of this voltage is shown in Fig. 7(b) which will be recognised as the usual linear saw-tooth scanning waveform generated, for example, by a Miller time-base circuit of well-known type which is synchronised at the proper frequency by synchronising pulses derived from the clock pulses. Fig. 7(a) shows the black-out waveform on a different time-scale to that used in Fig. 6. The fly-back occurs during the positive-going portion of the black-out wave and is triggered by the leading edge of this portion, the run-down being triggered by the trailing-edge, and lasting for a period of 32 clock-pulses. The black-out waveform is also applied to the direct-coupled flip-flop 35, this being triggered from one stable state to the other by the leading edge of the positive-going portion of the waveform. Outputs are taken from the anode circuits of both valves comprising the flip-flop 35, one being the paraphrased version of the other, these being shown in Fig. 7(c) and Fig. 7(d). This waveform will be called the "halver wave" its two versions being designated $H_a$ and $H_s$ respectively. The $Ha$ version (Fig. 7(d)) which is positive-going during the action beats (a "beat" being the time interval occupied by 36 clock pulses) is fed to output terminal 45, whilst the $Hs$ version (Fig. 7(c)), which is positive-going during the scan beats is fed to output terminal 60.

It is also necessary to produce in each of 32 separate wires a dash pulse coincident with one of the 32 dash pulses of Fig. 6(b) so that on the 32 wires there are dash pulses coincident with each and every one of the pulses of Fig. 6(b). These pulses will be called p-pulses and are numbered $p_0$ to $p_{31}$. In Figs. 6(h)–6(k) are shown the pulses numbered $p_0$, $p_1$, $p_2$ and $p_{31}$, these being coincident with the dash pulses numbered 0, 1, 2 and 31 respectively and each occurring once during the period of a beat. These p-pulses are generated by the circuit 36 (Fig. 5) which is described in the specification of co-pending application Serial No. 132,580, now Patent No. 2,683,802. Briefly this circuit comprises a series of 32 trigger circuits, all of which are fed with positive-going dash pulses over lead 37. Normally, these circuits are in an inoperative condition and produce no output, but can be conditioned by the application thereto of a positive transient voltage to produce an output coincident with the arrival of the dash pulse immediately following this positive voltage. The first trigger circuit is conditioned by the leading edge of the positive-going black-out waveform shown in Fig. 6(g) and produces the output pulse $p_0$ (Fig. 6(h)) which is fed to terminal 70. The trailing edge of the $p_0$ pulse is used to produce the positive voltage necessary to condition the second trigger circuit, which thus produces the output pulse $p_1$ (Fig. 6(i)) fed to terminal 71; this, in turn conditions the next trigger circuit which produces the output pulse $p_2$ (Fig. 6(j)) fed to terminal 72; and so on, to the last stage which produces the output pulse $p_{31}$ (Fig. 6(k)) fed to terminal 73. It is necessary to return each trigger circuit to its inoperative condition as soon as it has produced its output pulse; this is achieved by feeding back a negative transient voltage from the succeeding stage, this voltage being produced in the succeeding stage at the moment when this stage is conditioned by the trailing edge of output pulse fed to it from the preceding stage. The last stage is returned to its inoperative condition by a negative voltage derived from the leading edge of the paraphrased (negative-going) version of the black-out waveform.

The method of extracting instruction words one after the other from the main store of a machine and of utilizing them to set up the necessary routing circuits in accordance with the information contained therein will now be described with reference to the schematic diagram of the relevant parts of a machine shown in Fig. 8.

Figure 8:
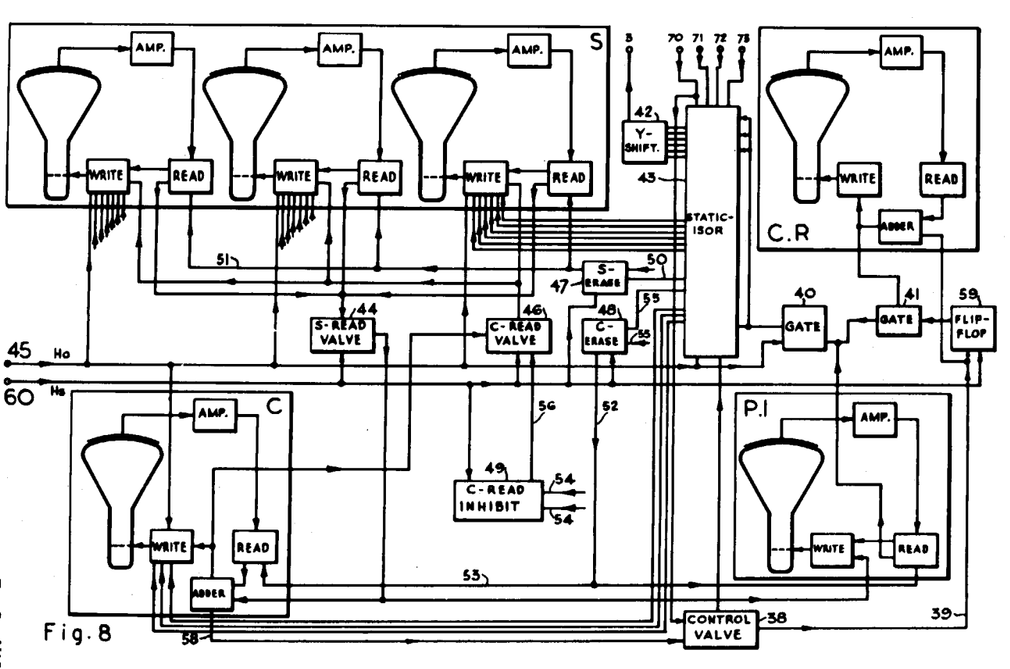
Fig. 8 is a block schematic diagram showing the relevant parts of a computing machine.

Referring to Fig. 8 the main store S comprises a number of cathode-ray storage units of which three are shown, the total number depending upon the required capacity of the store. Each unit operates in the manner described with reference to Fig. 1 and is illustrated diagrammatically in the manner shown in Fig. 2. The words are stored in parallel lines, one under the other in each tube, and the x and y deflector plates of all the tubes are operated in parallel, and consequently all the tubes in the store perform identical scan-action cycles. Each unit is provided with an amplifier and reading and writing circuits, which enable the stored words to be regenerated or read off to provide a dynamic output without erasing the record, and also permits dynamic words to be written into the store and stored words to be erased.

Figure 3:
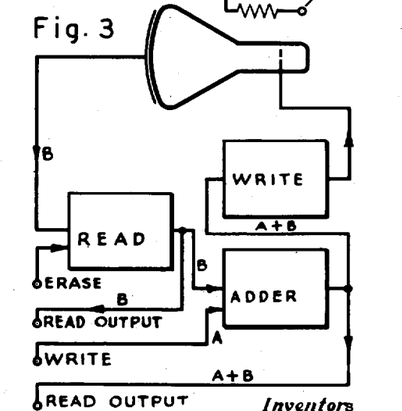

The accumulator C comprises a number of cathode-ray tube storage units which also operate in the manner described with reference to Fig. 1, each capable of storing one word on a single line display and provided with a regenerative loop comprising an amplifier, reading and writing circuits and including in the regenerative loop a computing circuit in the manner described with reference to Fig. 3. To simplify the drawing only one such storage unit and computing circuit (an adding circuit) is indicated.

The control register C. R. comprises a single cathode-ray tube storage unit with a regenerative loop comprising amplifier reading and writing circuits, and an adding circuit included in the regenerative loop. The control register is required to store only a single word on a single line display and is provided with an adding circuit similar to the adding unit in the accumulator. The present instruction store P. I. also comprises a cathode-ray tube storage unit adapted for storing one word on a single line and is provided with the normal regenerative loop comprising amplifier, reading and writing circuits. The control register and present instruction store are illustrated diagrammatically in the manner shown in Figs. 2 and 3 respectively, and the detailed circuits of the reading and writing circuits thereof are as described with reference to Fig. 1.

The digits of the word stored in the control register C. R. define the address in the main store S of the instruction word which has to be extracted therefrom. These instruction words are stored serially in the main store S so that by adding unity to the address number N stored in the control register C. R. at the completion of an operation by the machine, the address number N≠1 of the instruction defining the next operation is obtained. The pulse representing this added digit is derived at the completion of an operation, by the control valve 38 as will be described later, and is fed over lead 39 to one input of the adding circuit of the control register C. R. during the first scan beat. Simultaneously the new address number N≠1 is read out and used to condition routing circuits for the selection of the word having this address, which will be referred to as the "present instruction." The present instruction is read out of the main store into the present instruction store P. I. during the first action beat. During the second scan beat it is read out of the P. I. store and is used to condition the routing circuits for the selection of the appropriate number-word in the main store S. The words read out from the C. R. and P. I. stores are made available during scan beats only by a coincidence gate circuit 40 controlled by the $H_s$ version of the halver wave form fed from terminal 60; regeneration of information stored in the P. I. store is not essential as it is always read out in the same or successive beat to the beat in which it is written in. Words are read out from the control register C. R. once only and are fed to the remainder of the machine via the gate circuit 41 which is opened during the first scan beat only.

The reading and writing facilities of the main store S both involve the selection of a single address, namely a particular line in a particular unit. That portion of an instruction word which defines an address in the main store will be assumed to comprise 12 digits, 6 digits defining the lines and 6 digits defining the cathode-ray tube. The selection of the line is performed by a Y-shift generator 42, to be described later which is controlled by potentials on the first six wires leading from the staticisor 43. Selection of the appropriate tube is obtained by arranging that beam current flows only in the selected tube during any action period. Illumination of the desired tube is obtained by means of potentials on the second six wires leading from the staticisor 43 to black-out valves 80 (Fig. 1) in the writing circuits of the tubes, in a manner to be described. The staticisor 43 comprises a number of parallel circuits or stages equal in number to the number of digits available. Each stage includes a coincidence gate fed with the signals from the circuit 40 and also with the $p$-pulse appropriate to that digit position, so that the gate is operative only during the instant of time that a particular $p$-pulse is present. The output wires of the staticisor will thus have potentials which represent in static form the digit coefficients of the word fed thereto. Each stage of the staticisor can be re-set by the application thereto of an appropriate pulse, in a manner to be described, at the end of an action beat. Actually, each stage of the staticisor has two output terminals; on one, the "0" output, a negative voltage is developed and persists until the end of an action beat when the digit coefficient is "0" and a positive voltage is developed when the digit coefficient is a "1"; on the other, the "1" output, the negative voltage is developed when the digit coefficient is a "1" and the positive voltage when it is "0." The output wires from the staticisor are connected to the one or other of these terminals as is appropriate. The reading circuit associated with each unit in the main store has an output on which will be available the read signal occurring during any beat when the corresponding tube is brightened. All these outputs are fed to a gate circuit, the $s$ read valve 44. This circuit 44 is constituted by a coincidence gate circuit similar to other coincidence gate circuits herein described more particularly with reference to Fig. 10, and comprising two diodes having a common cathode load resistor connected to a source of negative potential, a negative-going output pulse being delivered to an output circuit connected to the common cathode load only when a negative-going input pulse is applied simultaneously to the anode of each diode. In $s$ read valve circuit 44, the anode of one diode is connected to terminal 60 (Fig. 8) and the anode of the other diode is connected to the Read output terminal 10 (Fig. 1) of each of the storage tube reading circuits of the main store S. The $s$ read valve is made operative, during action beats only, by means of the halver $H_s$ waveform which is of the appropriate negative polarity during action beats (see Fig. 7c) fed thereto from terminal 60 so that any output word from this valve will represent the word read out of a single selected address during an action beat. An output word from the $s$ read valve may have one of two destinations. If it is an instruction it is fed directly to the P. I. store while if it is a number it will be fed to one of the elementary computing circuits of the accumulator C. The destinations in C are chosen by blacking out all the cathode-ray tubes during action beats except the desired one. This provides adequate address selection as each computer tube stores only a single word and no line selection is required. The selection of the tube is controlled by digits in specified positions in the present instruction word, and in the example shown it is assumed that the last three digits perform this function. The output wires from the last three stages of the staticisor 43 are thus connected to the black-out valves 80 (Fig. 1) in the writing circuits of the units in the accumulator C. When these stages of the staticisor 43 are operated the word read from the store is passed directly to the selected destination address in the accumulator. When these stages are inoperative by virtue of the relevant digits indicating no address in the accumulator the read output is necessarily an instruction and is fed directly to the present instruction store P. I. These stages of the staticisor are reset only by a pulse which signifies that computation is complete and is derived from the control valve 38 in a manner to be described later. The relevant tube of the accumulator is thus brightened during all scan and action beats comprising an elementary computation period when this is extended beyond the normal period of a single beat. As distinct from this mode of operation the first twelve stages of the staticisor defining the S addresses are reset at the commencement of every scan beat by a pulse derived from the leading edge of the scan portion of the $H_a$ version of the halver waveform fed through terminal 45. The accumulator tubes are normally brightened during scan beats, even when these do not form part of an extended computation period, so that partial answers may be stored and regenerated in the accumulator.

Consider now the process of writing words into the main store S. Words to be written into the main store during operation of the machine, as distinct from words inserted into the machine as relevant date when setting up a problem, have only one possible source, namely the accumulator C. That portion of an instruction word which controls the last three staticisor stages now defines the source address, and the particular tube in the accumulator is brightened during the relevant action period. The output from all the reading circuits associated with the tubes in the accumulator are combined and fed to a gate circuit, the C-read valve 46, which comprises a coincidence gate circuit similar to that described above with reference to the $s$ read valve circuit, except that in this case the anode of one of the diodes is connected to terminal 60, and the anode of the other diode to the Read output $(A+B)$ terminal of the accumulator C (see Fig. 3). This C read valve 46 is made inoperative during scan beats by the positive going halver $H_s$ waveform, and the output from which is thus the word read during an action beat from the single selected tube in the accumulator. The output from the C-read valve is fed in parallel to the writing circuit terminals 11 (Fig. 1) of all the storage units in the main store S and is thus written into the address selected by the appropriate portion of the present instruction word which has set the first six stages of the staticisor to control the $y$-shift generator 42 and the second six stages to select the appropriate tube.

It can be seen that two portions of an instruction word can thus select addresses in the main store S and the accumulator C for transference of words therebetween, it being possible for each address to be either the source or the destination. Transference of words in both directions, however, can only be obtained if the reading circuit in the regenerative loop associated with the storage units in the main store and the accumulator is appropriately conditioned, either to read the word stored in the selected address and pass it out into the machine or to permit a word circulating in the machine to be written into the selected address. As explained in connection with Figs. 1–3, the writing of a word into a selected address may be so performed that the word written in replaces information, if any, previously stored in the address, but in this case the regenerative loop must be broken by applying an erase voltage to the reading circuit. In the case of the accumulator when a computation is proceeding, the actual word written in may be the result of a simple arithmetic operation performed between the word received from the main store and a word already stored in the selected address, in which case no erase voltage must be applied to the reading circuit.

The conditioning of the circuits for the two directions of word transfer require that the facility of reading words from the main store is prohibited during beats when writing into the store is to occur, and similarly that reading from the accumulator is prohibited during beats in which writing into the accumulator is required. The control of the prohibition is effected by the existence of a "0" or "1" digit, in a specified position in the present instruction word or in the address of the present instruction. This digit (called the $r$ digit) occupies, in the example shown, the thirteenth digit position, and output wires 50, 55 from the corresponding stage in the staticisor 43 are connected to the S-erase voltage generator 47 and the C-erase voltage generator 48, which generate waves, derived from the halver waveform, which are fed over leads 51, 52 to the erase terminals 12 (Fig. 1) of the reading circuits of the main store S, and erase terminal (see Fig. 2) of the reading circuit of the accumulator C, respectively. The output from 48 is also connected over lead 53 to the erase terminal (see Figs. 1 and 2) of the reading circuit in the P. I. store. The nature of the erase function may be more clearly understood by reference to the wave form diagram, Fig. 9, which indicates the form of the erase voltage wave to be applied to the store and accumulator gates for the two cases of reading from the store and writing into the computer ($s$—C) and reading from the computer and writing into the main store (C—S). A cycle of operation comprising two scan beats, 1 and 2, and two action beats 1 and 2, to the bar is illustrated. In order to read a word from the main store to the computer ($s$—C) the reading circuits of S, C, and P. I. are all functioning or "on" during scan 1 to permit regeneration of stored information, the read output from S and C being inhibited by the halver waveform $H_s$ applied to the S and C read valves 44 and 46, while the address of the present instruction is read out from the control register C. R. through gates 41 and 40 to the staticisor 43 to select the address of the present instruction in the main store. Thus during scan 1 all reading circuits are functioning, and no erase wave is present as indicated by ($a$) and ($b$) of Fig. 9. During the second beat (action 1) the present instruction is read from S to the P. I. store so that the C and P. I. reading circuits must be inhibited or "off" as indicated by the presence of the C-erase voltage in Fig. 9($b$), to prevent read outputs being obtained. During the third beat (scan 2) all stores are regenerating and the present instruction is read from P. I. through gate 40 to the staticisor 43; all reading circuits are thus functioning or "on," and neither erase voltage is present. During scan 2 reading from S or C is inhibited by the halvers waveform $H_s$ applied to the S and C read valves. During the fourth beat (action 2) a word is read from the main store to the accumulator. The C-erase voltage is therefore present to put the C and P. I. reading circuits in the "off" condition. The S-erase voltage remains absent. This form of inhibition with the C reading circuit rendered inoperative while writing is occurring, presupposes that a computation is not occurring between a number already in the accumulator store and the number being fed in. Obviously for such an operation the reading circuit must be operative and some other means must be found to prevent the read output being fed to the writing circuits of the main store S. This could be achieved by providing a third voltage generator 49 arranged to inhibit the C-read valve 46 during the second action beat whenever the operation to be performed during this beat includes a computation between a number already stored in C and the number fed from C to S. Obviously, when the generator 49 is active the generator 48 must be inactive, and to enable this to be achieved it is necessary to utilize an additional digit position in the present instruction word to enable this additional information to be conveyed. In the present example this second $r$ digit could occupy the fourteenth digit position in the present instruction word. Each of the voltage generators 47, 48, 49 must now be fed from the staticisor 43 over two wires in order that the three different conditions can be specified in terms of different combinations of the coefficients of the two $r$ digits; for example it could be arranged that when they are both "0," generator 47 is made active by negative voltage on wires 50; when they are both "1" generator 48 is made active by negative voltages on wires 55; and when they are "0" and "1" generator 49 is made active by negative voltage on wires 54. The generators are preferably coincidence gates, as shown in Fig. 11, which are also fed from terminal 60 with the $H_s$ version of the halver wave, this being negative-going during action beats, so that the output pulse will be negative-going for the duration of an action beat only. The operation of these generators 47, 48 and 49 will be described more fully later with reference to Fig. 11.

Figure 9:
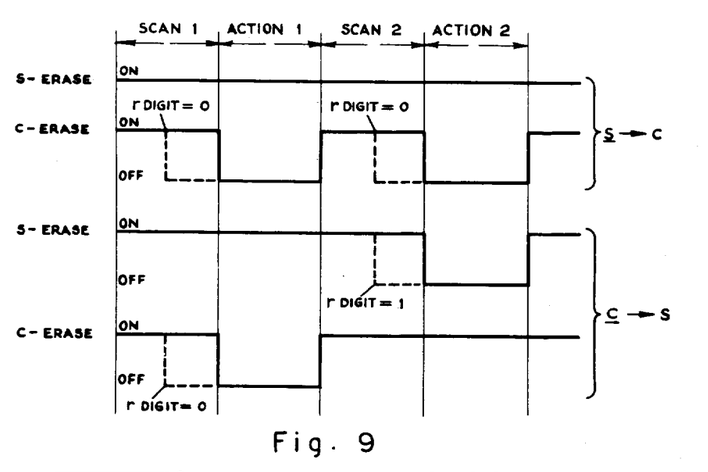
Fig. 9 is a diagram showing the waveforms utilized to effect transfer of information between the main store and accumulator of the machine illustrated in Fig. 8.

The curves ($c$) and ($d$) of Fig. 9 show the erase voltages for the reverse direction of word transmission C—S. The erase voltages during the first scan beat and for the first action beat are the same as in the case previously discussed. During the second scan and second action beats they are reversed, the S-erase voltage being "off" instead of the C-erase voltage during the second action beat. The dotted lines in Fig. 9 indicate the triggering of the appropriate staticisor stage by the $r$-digits occurring during scan beats.

The control valve 38 is a coincidence gate circuit which is fed with negative-going $p_o$ pulses from terminal 70 at the beginning of every beat. Such coincidence gate circuit may be constituted by two diodes connected as shown at $D_1$, $D_2$, Fig. 10, to be described later, and which provides a negative-going output pulse on the coincidence in time of two negative input pulses. A negative-going pulse is fed over line 58 to the circuit 38 at the beginning of that scan beat which follows the completion of an operation in the accumulator C; consequently the only $p_o$ pulse which passes the circuit 38 is that which follows the completion of an operation the nature of which is specified by the digits of the present instruction word set up on the staticisor 43. The negative pulse on line 58 is supplied from that computing circuit in C which was active during the previous action beat (or beats, if the time occupied by the computation is equal to that occupied by more than one beat, which is not usually the case). Each such computing circuit will have some characteristic, such as the known time it will take to perform its computation or the known time (one beat) taken to read from the accumulator, which is marked by an abrupt change of potential at the end of the beat or beats during which the computation circuit has been operative and which can be utilized to generate or release such a pulse.

The $p_o$ pulse from 38 is fed over line 39 to one input of the adding circuit of the control register C. R. The address number N of the instruction previously obeyed is changed to $N+1$, the address of the new instruction $N+1$ is written into C. R. store in place of N and is simultaneously read out through coincidence gate circuit 41, which is only open during the first scan beat. This is achieved by applying thereto a negative-going square wave lasting for the duration of the first scan beat, and generated by the flip-flop 59. This flip-flop is triggered on the grid of one valve by the negative-going $p_o$ pulse on lead 39 and is re-set at the end of the first scan beat by the negative-going trailing edge of the $H_s$ version of the halver wave from terminal 60, which is applied to the grid of the second valve of the flip-flop. It then remains quiescent until triggered by the next $p_0$ pulse on lead 39. The coincidence gate circuit 41 may also be constituted by a double diode gate circuit similar to diodes $D_1$, $D_2$ shown in Fig. 10 and more particularly described with reference thereto.

The new address number $N+1$ is fed during the first scan beat from gate 41 through another coincidence gate 40 of the type already referred to which is open during all scan beats by virtue of the $H_a$ version of the halver wave fed thereto from terminal 45, to the staticisor 43, which sets up appropriate voltages on the first twelve wires specifying the address $N+1$ of the present instruction in the main store S. The thirteenth digit of $N+1$ will be "0" so that the voltage on lead 50 will be such that during the next beat (action 1) an erase voltage from 48 will be applied to the reading circuits of C and P. I. whilst no erase voltage from 47 will be applied to the reading circuits of S. Thus during the first action beat, the present instruction is read from the selected reading circuit of S, through the S read valve 44 which is open during action beats by the $H_s$ waveform from terminal 60, to the writing circuit of the P. I. store, where it is written in in readiness for the next scan beat. During this scan beat the present instruction is read from the P. I. store through gate 40 to the staticisor 43 to set up appropriate voltages on all the output wires. The instruction is obeyed in the following beat or beats, and the cycle recommences.

Figure 10:
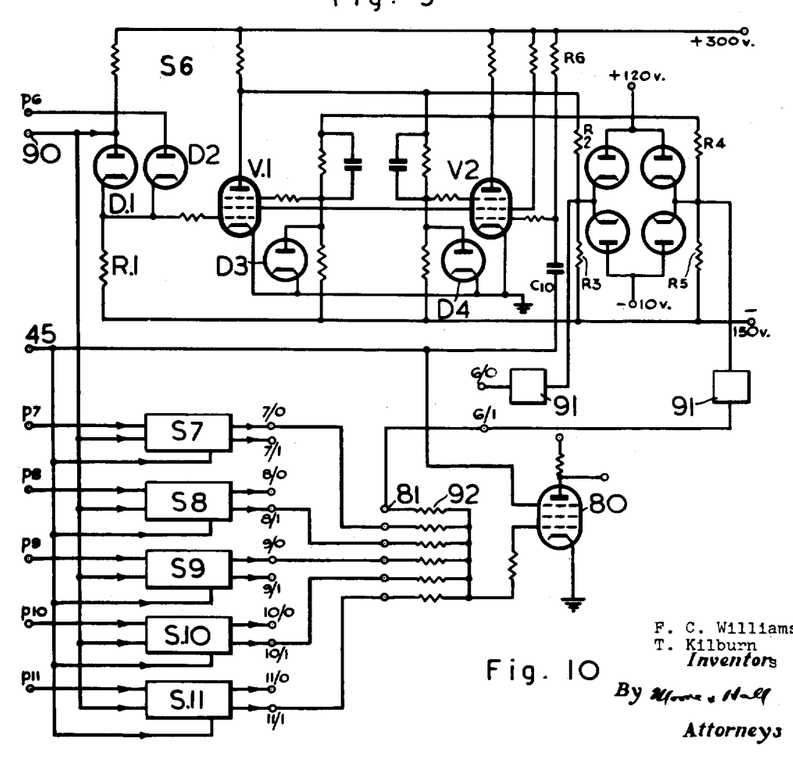
Figs. 10 and 11 are circuit diagrams of portions of the staticisor shown in Fig. 8.

The operation of the staticisor 43 will now be described in greater detail with reference to Fig. 10. As mentioned previously it contains as many stages as there are digit positions in an instruction word, the first six stages (numbered 0–5) being utilized for the selection of a particular line on a cathode-ray tube in the main store S, the second six stages (numbered 6–11) being utilized to select this tube. For the purposes of illustration, Fig. 10 shows only stages 6–11 and also the manner in which a particular tube (the fifty-third tube) is selected. The seventh stage $S_6$ is shown in detail, the remaining stages $S_7$–$S_{11}$ being identical. Each stage includes a coincidence gate circuit and a flip-flop circuit, and the examples of these circuits shown in Fig. 10 may be taken as typical of similar circuits referred to in the earlier parts of the description, but not described in detail.

The gate circuit comprises diodes $D_1$ and $D_2$ which have a common cathode resistor $R_1$ and have applied to their anodes in negative-going sense about resting levels of approximately $+3$ volts and $+5$ volts, the pulse train representing the instruction word from terminal 90 and the pulse $p_6$, respectively. Thus only when a pulse from terminal 90 (significant of a "1") occurs in the 7th digit position will both diodes $D_1$ and $D_2$, be cut off and a negative pulse appear at the common cathode point, owing to the connection of the lower end of $R_1$ to a negative source. The flip-flop comprises pentodes $V_1$ and $V_2$ with anode-suppressor grid coupling and diodes $D_3$, $D_4$ which prevent positive biasing of the suppressor grid and which are returned through high resistances to the same source of negative potential as the resistance $R_1$. In the quiescent or untriggered state of the flip-flop, valve $V_1$ is conducting and valve $V_2$ is cut off by its suppressor grid. The control grid of $V_2$ is not however normally cut-off and is returned through a high resistance $R_6$ to the positive H. T. supply.

When a pulse occurs therefore in the 7th digit position and a negative pulse appears at the cathodes of $D_1$ and $D_2$, $V_1$ is cut-off and the flip-flop is triggered to the condition with $V_2$ conducting to its anode. This condition is maintained until the $H_a$ version of the halver waveform fed in at terminal 45 and differentiated by $C_{10}$, $R_6$ produces a negative pulse on the grid $V_2$ at the end of an action beat and resets the flip-flop. This resetting operation, because of the nature of the halver waveform, only occurs at the end of every action beat and the instruction words are fed to the gate circuits during scan beats only so that the staticisor flip-flop hold the conditions significant of the appropriate digits from the instants of occurrence of these digits during a scan beat to the end of the succeeding action beat.

It now remains to utilize the staticised information indicated by the conducting or non-conducting state of a particular valve in each flip-flop. Each cathode-ray tube in the main store is provided with a black-out valve 80 (Figs. 1 and 10) which has fed to its suppressor grid the $H_a$ version of the halver waveform and whose anode thus supplies a square wave which is negative-going during action beats and is employed to black-out the cathode-ray tube. If, however, the valve 80 is held cut-off by its control grid during an action beat its cathode-ray tube will not be blacked-out. There is connected from the anode of each valve $V_1$, $V_2$ of each staticisor flip-flop to a negative source a potential divider $R_2$, $R_3$ and $R_4$, $R_5$ providing an output connection which assumes one of two potentials, say $+120$ volts and $-10$ volts, depending upon whether or not the valve is conducting to its anode. Thus the output point 6/0 associated with valve $V_1$ has a potential of $-10$ volts unless a "1" occurs in the 7th digit position when the flip-flop reverses and the output point potential rises to $+120$ volts. Similarly the output potentials from the other side of the flip-flop at output point 6/1 will be $+120$ volts for the occurrence of a "0" and $-10$ volts for the occurrence of a "1" respectively. Thus output points with the suffix /0 will be negative when the digit "0" is present, those with the suffix /1 will be negative when the digit "1" is present. The output points are connected to the potential dividers through cathode-follower stages 91. The control grid of the valve 80, has fed to it through terminals 81 and separate grid leaks 92 the potentials from the appropriate output points of the staticisor stages $S_6$–$S_{11}$ so that only when a particular combination of the second six digits occurs in the instruction word will all the grid leaks 92 of valve 80 be returned to potentials of $-10$ volts so that the valve is cut-off and the selected cathode-ray tube maintained bright for the ensuing action beat.

In the example chosen for illustration it is assumed that the valve 80 is associated with the fifty-third cathode-ray tube. If this tube is to be selected during an action beat the second six digits of the instruction word will be 1, 0, 1, 0, 1, 1, and the six grid leaks 92 of the valve 80 associated with this tube will require to be coupled to output points 6/1, 7/0, 8/1, 9/0, 10/1 and 11/1 as indicated in Fig. 11.

It will be appreciated that apparatus similar to that described above for the selection of a cathode-ray tube in the main store may be employed for the selection of a tube in the accumulator, the gate circuits of the last three staticisor stages being fed with the appropriate $p$ pulses to select those digits of an instruction word indicative of the accumulator address. The same gating arrangements may be employed to select the thirteenth and fourteenth digits defining the direction of word transfer between main store and accumulator. In Fig. 11 there is shown these two stages of the staticisor, $S_{12}$ and $S_{13}$ and the method of connecting the outputs to the three voltage generators 47, 48 and 49 of Fig. 8. In Fig. 11, only the circuit of generator 47 is shown in detail, but the circuits of generators 48, 49 are identical with that shown for generator 47 except that the anodes of the diodes are connected to different terminals of the staticisor stages $S_{12}$, $S_{13}$. In each case, three diodes constitute a coincidence gate operating in the manner of diodes $D_1$, $D_2$, shown in Fig. 10, but as there are now three diodes a negative-going output pulse is obtained at terminals 51, 52, 56 only when negative-going pulses are applied simultaneously to the anodes of all three diodes. One of the three diode anodes of each generator 47, 48, 49 is connected to terminal 60 (see also Fig. 8) to which is applied the halver $H_a$ waveform (Fig. 7c); the other two diode anodes in each generator are connected to the appropriate pairs of terminals of the staticisor stages $S_{12}$, $S_{13}$. In the present example, there two diode anodes of generator 47 are connected respectively to terminal 13/0 of staticisor stage $S_{13}$ and terminal 12/0 of staticisor stage $S_{12}$. The corresponding diode anodes of generator 48 are connected respectively to terminal 12/1 of staticisor stage $S_{12}$ and terminal 13/1 of staticisor stage $S_{13}$. Similarly, the corresponding diode anodes of generator 49 are connected respectively to terminal 13/1 of $S_{13}$ and terminal 12/0 of $S_{12}$. The thirteenth and fourteenth stages $S_{12}$, $S_{13}$ of the staticisor are indicated by block diagrams in Fig. 11, but the circuits of these stages are identical to the detailed circuit of the seventh stage $S_6$ shown in Fig. 10, and the selection of the thirteenth and fourteenth digits of an instruction word, defining the direction of word transfer between main store S and accumulator C, is effected in precisely the same manner as the seventh digit is selected by the stage $S_6$, as described earlier with reference to Fig. 10.

In order to select the desired line in a chosen tube in the main store S, the first six stages of the staticisor, which are similar to stages $S_6$–$S_{11}$, are used to control the Y-shift generator circuit 42 (Fig. 8). The output voltage from this generator, which is applied to the Y-deflection plates of all the tubes in the main store S, is such as to enable the sequential scanning of lines 1, 2, 3 etc. during scan beats to be intercalated with the scanning of selected lines during action beats. A circuit for producing such a voltage is described in the specification of co-pending application Serial No. 93,612. This circuit includes a number of valve stages, equal to the number of digit positions required to select a line (in this case, six) the outputs from these stages being added through suitable "weighing" circuits to produce the desired waveform. There are two inputs to each stage; one, which is active during scan beats only produces the stepped waveform necessary for the sequential scanning of the lines; the other, which is applied during action beats only consists of a positive or negative bias voltage derived from the output of a separate flip-flop circuit for each stage and fed through an anode follower to this valve stage the alternation between one input and the other being controlled by the halver waveform. In the circuit described in the specification of the above co-pending application, the flip-flops are set manually by switches to deliver bias voltages of polarities appropriate to the coefficients of the digits specifying the number of the line to be selected during an action beat. For automatic operation these bias voltages are derived not from manually set flip-flops, but from the 0/0–6/0 output terminals of the first six stages of staticisor 43, which as in the case of stages $S_6$–$S_{11}$ are set up during a scan beat, remain in this condition during the next action beat and are re-set by the $H_a$ version of the halver waveform at the end of the action beat.

We claim:

1. In a digital computing machine employing a main store comprising at least one cathode-ray tube storage device having a regeneration circuit in which regeneration occurs during scan beats and a selected number is made available during intervening action beats, the provision of a subsidiary store for temporarily retaining at least one number for a period at least equal to that of one beat of the machine operation, a plurality of potential controlled routing devices for determining the number transfer paths within the machine, a staticisor device to provide a plurality of sustained output potentials in dependence upon the form of a dynamic input pulse signal applied thereto, means for transferring a selected instruction number from said main store to said subsidiary store, means for transferring said selected instruction number from said subsidiary store to said staticisor as a dynamic input pulse signal therefor during an action beat of said machine and means for applying the output potentials from said staticisor to said routing devices as control media therefor whereby the latter are set to the required transfer path during the immediately following scan beat.

2. In a digital computing machine employing a main store comprising at least one cathode-ray tube storage device having a regeneration circuit in which regeneration occurs during scan beats and a selected number is made available during intervening action beats, the provision of a staticisor to provide a plurality of control potentials for conditioning routing circuits within the machine during the time occupied by a scan beat in accordance with information in dynamic signal form contained in a selected instruction number which is read from the main store during the immediately preceding action beat, and a subsidiary instruction store also comprising a cathode-ray tube storage device having a regeneration circuit, means for reading the selected instruction number from said main store, means for writing said selected instruction number into said subsidiary instruction store, and means for reading said selected instruction number in dynamic signal form from the subsidiary instruction store and feeding it to said staticisor during said scan beat.

3. In a digital computing machine according to claim 2, the provision of means for effecting the sequential selection of instruction numbers to be read from the main store to the subsidiary instruction store during action beats, said means including a control register comprising a cathode-ray tube storage device having a regeneration circuit including an adding circuit, means for reading from said control register during the scan beat immediately preceding each of said action beats an address number representing the address in the main store of an instruction number, together with means for feeding said address number to said staticisor and means for applying a pulse to said adding circuit at the completion of the operation defined by said instruction number to provide a new number representing the address of the next instruction number in the sequence.

4. In a digital computing machine employing a main store comprising a plurality of cathode-ray tube storage devices, each having a regeneration circuit including reading and writing circuits and in which regeneration occurs during scan beats and a selected number is made available during intervening action beats, the provision of a staticisor to provide a plurality of control potentials for conditioning routing circuits within the machine during the time occupied by a scan beat in accordance with information in dynamic signal form contained in a selected instruction number which is read from the main store during the immediately preceding action beat, a subsidiary instruction store also comprising a cathode-ray tube storage device having a regenerative circuit, means for reading the selected instruction number from said main store, means for writing said selected instruction number into said subsidiary instruction store, means for reading said selected instruction number in dynamic signal form from the subsidiary instruction store and feeding it to said staticisor during said scan beat, and a beam black-out device in each writing circuit of said main store comprising a thermionic valve, means responsive to anode current flow in said thermionic valve to apply a beam cut-off potential to the beam control electrode of the associated cathode-ray tube, and circuit means connecting a control electrode of said black-out valve to an output of said staticisor, whereby a particular cathode-ray tube is selected during an action beat by the application to said control electrode of the associated black-out valve of negative cut-off voltages set up on said staticisor output during the immediately preceding scan beat in accordance with information contained in said selected instruction number.

5. In a digital computing machine in accordance with claim 2, the provision of a staticisor comprising a number of stages equal to the number of digit positions in an instruction number, each stage comprising a coincidence gate consisting of two diode valves, circuit means connecting the cathodes of both diodes together and through a common resistor to a source of negative potential, circuit means connecting said cathodes to the triggering input electrode of a direct-coupled flip-flop circuit provided with paraphase output circuits, an input line common to all the stages of said staticisor to receive the digit pulses representing an instruction word, circuit connections between said common input line and the anode of one of said diodes, an input line individual to each stage to receive a pulse coincident with the particular digit pulse to be selected by that stage, circuit means connecting said other diode of each stage to its respective individual input line, and circuit means connecting the re-setting input electrode of said flip-flop by way of a differentiating circuit to a square-wave generator providing positive-going pulses persisting for the duration of an action-beat, whereby said flip-flop is reset by the trailing edge of said pulses from said square-wave generator.

6. In a binary digital computing machine in accordance with claim 4 the provision of cathode-ray-tube selecting means wherein the control electrode of each blackout valve is connected to a selected one of two output terminals of each of $n$ stages of the staticisor device where $n$ is the number of digit positions necessary to represent in the binary scale the total number of cathode-ray-tubes in the main store, the said selected one of the two output terminals of each stage of said staticisor being chosen to to produce a negative potential when the coefficient of an input signal digit fed to such stage has the required binary significance value.

7. In a digital computing machine according to claim 2 and including an accumulator comprising at least one cathode-ray-tube storage device having a regeneration circuit including a computing circuit, the provision of an erase voltage generator responsive to control voltages from said staticisor to provide during action beats and when so conditioned by said staticisor, an erase voltage to inhibit the passage of signals through the regeneration circuit of the operative main store cathode-ray-tube, said control voltages being provided by said staticisor during an immediately preceding scan beat in accordance with information contained in an instruction number fed to the staticisor.

8. In a digital computing machine according to claim 2 and including an accumulator comprising at least one cathode-ray-tube storage device having a regeneration circuit including a computing circuit, the provision of at least one erase voltage generator responsive to control voltages from said staticisor to provide during action beats and when so conditioned by said staticisor, an erase voltage to inhibit the passage of signals through the regeneration circuit of said accumulator cathode-ray-tube, said control voltages being provided by said staticisor during an immediately preceding scan beat in accordance with information contained in an instruction number fed to the staticisor.

9. In a digital computing machine according to claim 2 and including an accumulator comprising at least one cathode-ray-tube storage device having a regeneration circuit including a computing circuit, the provision of a voltage generator responsive to control voltages from said staticisor to provide during action beats and when so conditioned by said staticisor, a voltage to inhibit the passage of signals through a connection between the input to the writing circuit of a cathode-ray-tube storage device in said accumulator and the writing circuit of the operative cathode-ray-tube storage device in said main store, said control voltages being provided by said staticisor during an immediately preceding scan beat in accordance with information contained in an instruction number fed to the staticisor.

10. In a digital computing machine according to claim 2 the provision of an erase voltage generator responsive to control voltages from said staticisor to provide during action beats and when so conditioned by said staticisor, an erase voltage to inhibit the passage of signals through the regeneration circuit of the main store cathode-ray-tube, said control voltages being provided by said staticisor during an immediately preceding scan beat in accordance with information contained in an instruction number fed to the staticisor.

11. In a digital computing machine according to claim 2 and including an accumulator comprising at least one cathode-ray-tube storage device having a regeneration circuit including a computing circuit, the provision of a first erase voltage generator and a second erase voltage generator each responsive to control voltages from said staticisor to provide during action beats and when so conditioned by said staticisor, erase voltages to inhibit respectively the passage of signals through the regeneration circuit of the operative main store cathode-ray-tube and the regeneration circuit of said accumulator cathode-ray-tube said control voltages being provided by said staticisor during an immediately preceding scan beat in accordance with information contained in an instruction number fed to the staticisor.

12. In a digital computing machine according to claim 2 and including an accumulator comprising at least one cathode-ray-tube storage device having a regeneration circuit including a computing circuit, the provision of a first voltage generator and a second voltage generator each responsive to control voltages from said staticisor to provide, during action beats and when so conditioned by said staticisor, voltages to inhibit respectively the passage of signals through the regeneration circuit of said accumulator cathode-ray-tube and the passage of signals through a connection between the input to the writing circuit of a cathode-ray-tube storage device in said accumulator and the writing circuit of a cathode-ray-tube storage device in said main store, said control voltages being provided by said staticisor during an immediately preceding scan beat in accordance with information contained in an instruction number fed to the staticisor.

13. In a digital computing machine according to claim 2 and including an accumulator comprising at least one cathode-ray-tube storage device having a regeneration circuit including a computing circuit, the provision of first, second and third voltage generators each responsive individually to control voltages from said staticisor to provide respectively, during action beats and only when so conditioned by said staticisor, a first voltage to inhibit the passage of signals through the regeneration circuit of the operative cathode-ray-tube storage device of said main store, a second voltage to inhibit the passage of signals through the regeneration circuit of said accumulator cathode-ray-tube storage device and a third voltage to inhibit the passage of signals through a connection between the input to the writing circuit of the cathode-ray-tube storage device in said accumulator and the writing circuit of the operative cathode-ray-tube storage device in said main store, said control voltages being provided by said staticisor during an immediately preceding scan beat in accordance with information contained in an instruction number fed to the staticisor.

14. In a digital computing machine in accordance with claim 7 wherein said erase voltage generator comprises a coincidence gate circuit comprising at least three unilaterally conductive devices with their cathodes interconnected and joined through a common resistor to a source of negative potential, circuit means connecting the anode of one of said unilaterally conductive devices to a square wave generator providing negative-going pulses persisting for the duration of an action beat and circuit means connecting the respective anodes of each of the other of said unilaterally conductive devices to that one of the two output terminals of different chosen stages of said staticisor which produce a negative voltage when the coefficient of the corresponding input digit signal fed to such stage has the chosen binary value.

15. In a digital computing machine in accordance with claim 8 wherein said erase voltage generator comprises a coincidence gate circuit comprising at least three unilaterally conductive devices with their cathode interconnected and joined through a common resistor to a source of negatvie potential, circuit means connecting the anode of one of said unilaterally conductive devices to a square wave generator providing negative-going pulses persisting for the duration of an action beat and circuit means connecting the respective anodes of each of the other of said unilaterally conductive devices to that one of the two output terminals of different chosen stages of said staticisor which produce a negative voltage when the coefficient of the corresponding input digit signal fed to such stages has the chosen binary value.

16. In a digital computing machine in accordance with claim 9 wherein said voltage generator comprises a coincidence gate circuit comprising at least three unilaterally conductive devices with their cathodes interconnected and joined through a common resistor to a source of negative potential, circuit means connecting the anode of one of said unilaterally conductive devices to a square wave generator providing negative-going pulses persisting for the duration of an action beat and circuit means connecting the respective anodes of each of the other of said unilaterally conductive devices to that one of the two output terminals of different chosen stages of said staticisor which produce a negative voltage when the coefficient of the corresponding input digit signal fed to such stage has the chosen binary value.

17. An electronic digital computing machine comprising a main storage device having a plurality of separate, immediately accessible and sequentially numbered storage locations each capable of holding a separate instruction or number word, address selecting means by which the contents of any of said separate storage locations is made available by the supply of an appropriate address number signal thereto, a control register comprising a cathode-ray-tube storage device, an adding circuit in the regenerative loop of such storage device, means for supplying a constant value number-altering signal to said adding circuit at the beginning of each sequential operation cycle of said computing machine and means for supplying the output from said adding circuit to said address selecting mechanism whereby a plurality of separate instructions disposed in said main store at address locations which are equally spaced from the adjacent instruction signals by an amount corresponding to said altering signal, will be worked through automatically by said machine.

References Cited in the file of this patent

A Digital Computer for Scientific Applications, West and De Turk, Proceedings of the I. R. E., December 1948, pages 1452 to 1460.

Calculating Instruments and Machines, D. R. Hartree, University of Illinois Press, 1949, Section 8.6, pages 106–109.

"A Memory Tube," A. V. Haeff, Electronics, September 1947, pp. 80–83. "Dynamically Regenerated Electrostatic Memory System," Eckert et al., presented 1949 I. R. E. Convention, March 8, 1949.